United States Patent
Ding et al.

(10) Patent No.: US 7,621,290 B2
(45) Date of Patent: Nov. 24, 2009

(54) GAS DELIVERY METHOD AND SYSTEM INCLUDING A FLOW RATIO CONTROLLER USING ANTISYMMETRIC OPTIMAL CONTROL

(75) Inventors: Junhua Ding, Tewksbury, MA (US); John A. Smith, North Andover, MA (US); Kaveh H. Zarkar, Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 453 days.

(21) Appl. No.: 11/111,646

(22) Filed: Apr. 21, 2005

(65) Prior Publication Data

US 2006/0237063 A1    Oct. 26, 2006

(51) Int. Cl.
*G05D 7/06* (2006.01)
(52) U.S. Cl. .................. 137/9; 137/487.5; 118/715
(58) Field of Classification Search .............. 137/9, 137/487.5; 118/715
See application file for complete search history.

(56) References Cited

U.S. PATENT DOCUMENTS

| | | | |
|---|---|---|---|
| 2,895,502 | A | 7/1959 | Roper et al. |
| 3,556,126 | A * | 1/1971 | Oswald ............. 137/118.04 |
| 4,107,246 | A | 8/1978 | LaSpisa |
| 4,369,031 | A | 1/1983 | Goldman et al. |
| 5,329,965 | A | 7/1994 | Gordon |
| 5,453,124 | A | 9/1995 | Moslehi et al. |
| 6,333,272 | B1 | 12/2001 | McMillin |
| 6,418,954 | B1 | 7/2002 | Taylor et al. |
| 6,752,166 | B2 | 6/2004 | Lull et al. |
| 6,766,260 | B2 | 7/2004 | Ambrosina et al. |
| 7,353,841 | B2 | 4/2008 | Kono et al. |
| 2002/0038669 | A1 | 4/2002 | Yamagishi et al. |
| 2003/0130807 | A1 | 7/2003 | Ambrosina et al. |
| 2006/0237063 | A1 | 10/2006 | Ding |

FOREIGN PATENT DOCUMENTS

WO    2002095519    11/2002

OTHER PUBLICATIONS

Seborg, et al., "Process Dynamics and Control", Copyright 1989, by John Wiley & Sons, Inc., ISBN 0-471-86389-0, pp. 390-393.
International Search Report for related PCT Application No.: PCT/US2008/050834.
Written Opinion for related PCT Application No.: PCT/US2008/050834.

* cited by examiner

*Primary Examiner*—Kevin L Lee
(74) *Attorney, Agent, or Firm*—McDermott Will & Emery LLP (57) ABSTRACT

The antisymmetric optimal control algorithm is disclosed for a gas delivery system including a flow ratio controller for dividing a single mass flow into at least two flow lines. Each flow line includes a flow meter and a valve. Both valves of the flow ratio controller are controlled through a ratio feedback loop by the antisymmetric optimal controller which includes a single input single output SISO controller, an inverter and two linear saturators. The output of the SISO controller is split and modified before being applied to the two valves. The two valve control commands are virtually antisymmetric to the maximum allowable valve conductance position. Due to the fact that these two valve commands are passing through respective linear saturators with the maximum allowable valve conductance position as one of the two saturation limits, the net effect is that one valve is kept at the maximum allowable valve conduction position at any moment of time while the other is actively controlled to maintain the flow ratio.

15 Claims, 7 Drawing Sheets

GAS DELIVERY METHOD AND SYSTEM INCLUDING A FLOW RATIO CONTROLLER USING ANTISYMMETRIC OPTIMAL CONTROL

FIELD OF THE DISCLOSURE

The present disclosure relates generally to semiconductor processing equipment and, more particularly, to a flow ratio controller for delivering contaminant-free, precisely metered quantities of process gases to at least two processing tools and/or chambers. More particularly, the present disclosure relates to a system for and method of dividing flow from a single gas box to at least two processing tools and/or vacuum chambers.

BACKGROUND OF THE DISCLOSURE

The fabrication of semiconductor devices often requires the careful synchronization and precisely measured delivery of as many as a dozen gases to a processing tool and/or chamber. Various recipes are used in the fabrication process, and many discrete processing steps, where for example a semiconductor device is cleaned, polished, oxidized, masked, etched, doped, metalized, can be required. The steps used, their particular sequence and the materials involved all contribute to the making of particular devices.

Accordingly, wafer fabrication facilities are commonly organized to include areas in which chemical vapor deposition, plasma deposition, plasma etching, sputtering and other similar gas manufacturing processes are carried out. The processing tools, be they chemical vapor deposition reactors, vacuum sputtering machines, plasma etchers or plasma enhanced chemical vapor deposition chambers, etc. must be supplied with various process gases. Pure gases must be supplied to the tools in contaminant-free, precisely metered quantities.

In a typical wafer fabrication facility the gases are stored in tanks, which are connected via piping or conduit to a gas delivery system. The gas delivery system includes a gas box for delivering contaminant-free, precisely metered quantities of pure inert or reactant gases from the tanks of the fabrication facility to a process tool and/or chamber. The gas box typically includes a plurality of gas flow lines each having a gas metering unit, which in turn can include valves, pressure regulators and transducers, mass flow controllers and filters/purifiers. Each gas line has its own inlet for connection to separate sources of gas, but all of the gas paths converge into a single outlet for connection to the process tool.

Sometimes dividing or splitting the combined process gases among multiple processing tools and/or chambers is desired. In such cases, the single outlet of the gas box is connected to multiple process tools and/or chambers through secondary flow lines. In some applications, where for example, the upstream pressure needs to be kept lower (e.g., 15 PSIA) for safety or other reasons, a flow ratio controller is used to insure that the primary flow of the outlet of the gas box is divided in accordance with a preselected ratio among the secondary flow paths. Examples of split flow systems are described in U.S. Pat. Nos. 4,369,031; 5,453,124; 6,333,272; 6,418,954 and 6,766,260; and published U.S. Application No. 2002/0038669. The flow ratio controller of U.S. Pat. No. 6,766,260 is of particular interest because each second flow line is controlled with a separate flow meter and control valve.

Flow ratio controllers of the type shown in U.S. Pat. No. 6,766,260 will quickly stabilize to the desirable ratio split when initially set, but flows take time to be stabilized, and in some applications this can be unsatisfactory. Further, the pressure drop across the flow ratio controller is high, and the controller provides poor control performance for handling downstream blocking of one of the secondary flow paths. Additionally, the system can be difficult to set up because of difficulties in initially determining fixed valve positions of the valves in the secondary flow lines. And for embodiments using two secondary flow lines it is necessary to assign the high flow valve as the fixed valve and the low flow valve as the controlled valve for flow ratio control.

BRIEF DESCRIPTION OF THE DRAWINGS

Reference is made to the attached drawings, wherein elements having the same reference character designations represent like elements throughout, and wherein.

DETAILED DESCRIPTION OF THE DRAWINGS

Figure 1:
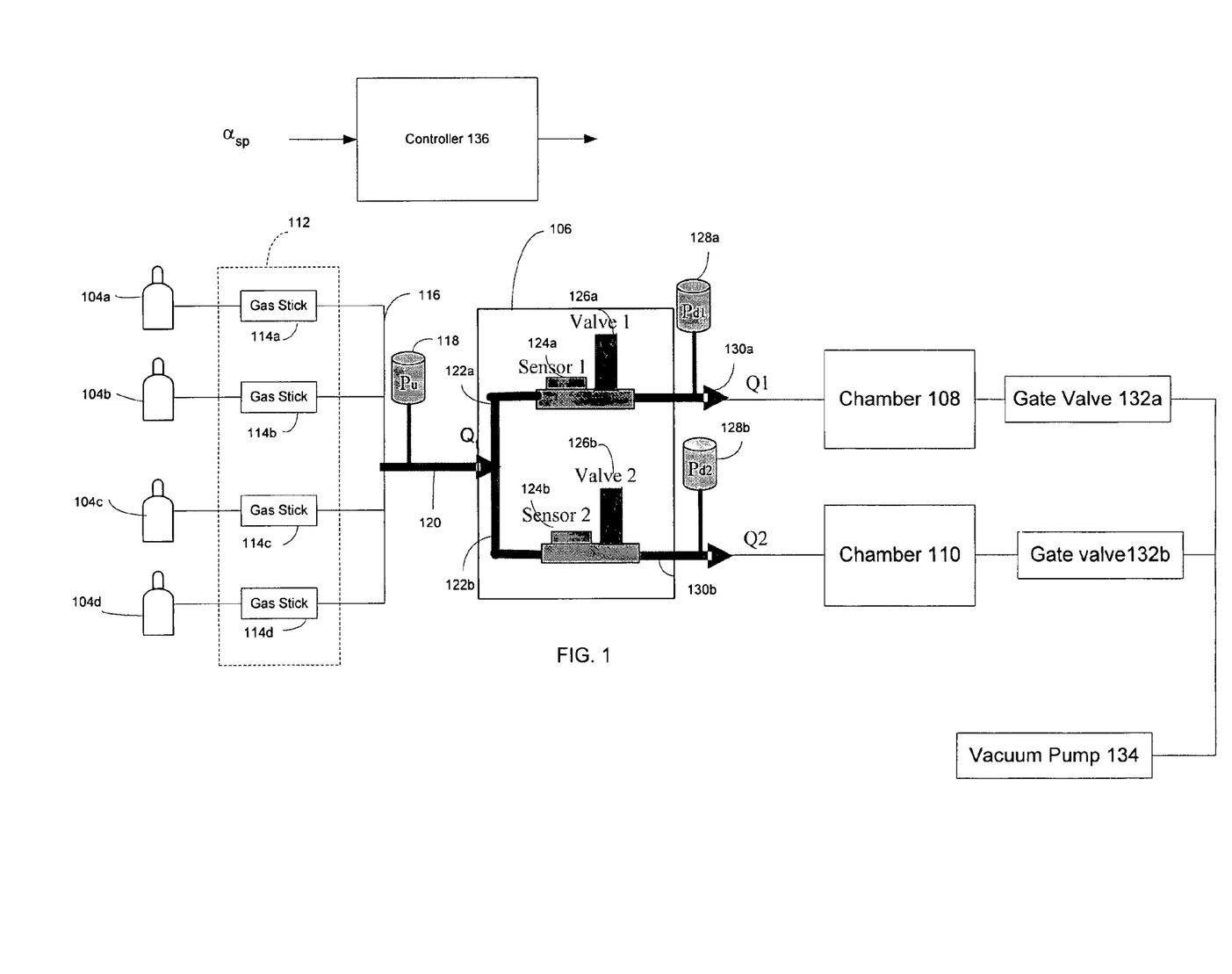
FIG. 1 is a general block diagram of a preferred embodiment of a gas delivery system including a Flow Ratio Controller configured in accordance with the present disclosure.

Referring to FIG. 1, the present disclosure provides a novel control algorithm for a flow ratio controller for dividing flow between two secondary flow paths of a gas delivery system. The system and method are intended for use with gas metering systems for delivering contaminant-free, precisely metered quantities of process and purge gases to semiconductor processing tools and/or chambers. The system and method provide the benefit of dividing a single flow of gas into two secondary flows of known, precise values in a preselected ratio, without requiring a relatively high upstream pressure. The flow ratio controller, generally shown at 106 in FIG. 1 as a part of gas delivery system 102, selectively receives individually or mixtures of multiple gases, including, for example a number of process gases and a purge gas, from gas supplies (e.g., gas tanks) 104a, 104b, 104c, 104d. The gas box 112 supplies the gas mixture to flow ratio controller 106, the latter being shown connected to two process chambers 108 and 110 (alternatively, the gases can be metered to different injectors or areas of a single process chamber and or other processing tools). The gas box 112 includes a plurality of gas sticks 114a, 114b, 114c and 114d, each preferably being fluidly connected to a corresponding gas supply 104 and for individually controlling the flow of gas from the corresponding gas supply 104. Although four gas supplies 104 and corresponding gas sticks 114 are shown in FIG. 1, the number of supplies and gas sticks can be any number (including one). Each gas stick 114 includes, for example, a mass flow controller (MFC), a valve positioned before the MFC and a valve positioned after the MFC, as for example, shown in U.S. Pat. No. 6,418,954. The gas sticks 114 each provide a controllable gas passageway so that a contaminant-free, precisely metered amount of a gas, or combination of gases, can be supplied to the flow ratio controller 106, and then precisely split/divided to the process chambers 108, 110 at a preselected flow ratio. Although not shown, the gas sticks can each be provided with other components for monitoring or controlling gases, such as filters, purifiers, and a pressure transducers and controllers. The sticks 114 connect together to an outlet manifold 116 for example, to allow the gas flows from each to stick to be mixed if desired prior to leaving the gas box. The outlet manifold is connected to the flow ratio controller 106.

The flow ratio controller 106 includes at least two flow paths or lines 122a and 122b. Each flow path includes a flow meter comprising a sensor 124 for generating a flow rate signal for use in controlling a valve 126, and therefore control the mass flow through each flow path. The sensor and valve are thus used together to control the output mass flow $Q_1$ and $Q_2$, and thus the flow ratio $\alpha = Q_2/Q_1$. In the embodiment described herein, the control valves 126a and 126b are normally opened valves, but it should be appreciated that the disclosed system can also be designed with normally closed valves. The outlet 130a and 130b of each of the flow paths is connected to a corresponding processing tool and/or chamber, which in the FIG. 1 illustration, are processing chambers 108 and 110, respectively. The chambers are in turn provided with outlets connected to control valves, preferably in the form of gate valves 132a and 132b, which in turn are in fluid communication with a vacuum pump 134, for using in drawing gases from the tanks through the chambers. The controller 136, among other things, receives an input $\alpha_{sp}$, the preselected value or set point of the ratio of the flow rates through each of the flow lines 122a and 122b, as will be more fully apparent hereinafter, and the controller is configured, among other things, to control and maintain the split ratio of mass flow through the flow lines 122a and 122b at the set point.

The system of FIG. 1 is analyzed and modeled accordingly to provide faster settling times for the flow ratio and the flows that are provided in the secondary flow lines, and provide the minimum pressure drop through the flow ratio controller for a given flow ratio set point. In general the flow in each secondary flow line is a function of the upstream pressure, and the downstream pressure and the electrical current provided to the valve controlling the flow in the line. Thus, $$Q_1 = Q_1(I_1, P_u, P_{d1}) \tag{1}$$

$$Q_2 = Q_2(I_2, P_u, P_{d2}) \tag{2}$$

where $Q_1(I_1, P_u, P_{d1})$ and $Q_2(I_2, P_u, P_{d2})$ are the two nonlinear functions which relate the output flow rates ($Q_1$ and $Q_2$) to the inputs of valve current ($I_1$ and $I_2$), upstream pressure ($P_u$), and downstream pressure ($P_{d1}$ and $P_{d2}$). Note that two lines share the same upstream pressure, Pu, but have different downstream pressure, $P_{d1}$ and $P_{d2}$, respectively. Equation (1) and (2) can be linearized with respect to $P_u$ by ignoring the effect of the downstream pressure $P_{d1}$ and $P_{d2}$ as $$Q_1 = C_1(I_1) \cdot P_u \tag{3}$$

$$Q_2 = C_2(I_2) \cdot P_u \tag{4}$$

where $C_1(I_1)$ is the conductance of valve 1 which is a function of the valve current $I_1$, and $C_2(I_2)$ the conductance of valve 2 which is a function of the valve current $I_2$.

To model the settling times of the flow rates and the upstream pressure change in response to setting a predetermined ratio, one can start with the equation for the conservation of mass:

$$(V_u/P_{stp}) \cdot (T_{stp}/T) \cdot dP_u/dt = Q_t - Q_1 - Q_2 \tag{5}$$

where $V_u$ is the upstream volume;
  $P_{stp}$ is the standard pressure which is 110132.5 $P_a$ or 14.7 psia;
  $T_{stp}$ is the standard temperature which is 273.2 K or 0° C.;
  T is the temperature of the gas to be delivered in the system;
  $P_U$ is the upstream pressure of the gas to be delivered in the system;
  $Q_t$ is the total inlet flow; and
  $Q_1$ and $Q_2$ are the flows through the respective secondary flow paths.

Substituting Equations (3) and (4) into Equation (5), results in the following:

$$V_u/P_{stp} \cdot (T_{stp}/T) \cdot dP_u/dt = Q_t - C_1(I_1) \cdot P_u - C_2(I_2) \cdot P_u \tag{6}$$
$$= Q_t - (C_1(I_1) + C_2(I_2)) \cdot P_u$$
$$= Q_t - C_t \cdot P_u.$$

where $C_t$ is the total conductance of the control valves 126a and 126b as:

$$C_t = C_1(I_1) + C_2(I_2) \tag{7}$$

Therefore, the upstream pressure $P_u$ in Equation (6) is a first order system, which has the time constant, $\tau_p$, as $$\tau_p \approx V_u/C_t \tag{8}$$

Note that the settling time for a first order system is proportional to the time constant, $\tau_p$. Therefore by minimizing the time constant, $\tau_p$, the settling time of the upstream pressure $P_u$ can be minimized. Because the settling time for flows are the same as the settling time for the upstream pressure as indicated by Equations (3) and (4), the system should have a fast settling time for flows if $\tau_p$ is small.

Furthermore, the upstream pressure $P_u$ at steady state can be obtained by setting the left side of Equation (6) to be zero and rearranging it as $$P_u \approx Q_t/C_t \tag{9}$$

It is desirable to minimize the upstream pressure $P_U$ in order to have a minimum pressure drop through the flow ratio controller 106. As is evident from Equation (9), the upstream pressure can be minimized by maximizing the total valve conductance, $C_t$.

As is evident from equation (8), it is therefore desirable to minimize $\tau_p$ in order to minimize the setting time for flows by either minimizing $V_u$ or maximizing $C_t$, or both. Thus, as a design criterion, it is preferable to decrease the upstream volume as much as possible. One can install the flow ratio controller as close to the gas box 112 as possible to reduce the upstream volume there between. However, it is more difficult, if not impossible to control the upstream volume, and easier to control the conductance $C_t$ of the control valve. In order to increase the conductance of the valve, it is preferable to design the valve with larger orifice so that when the control system pushes the valve to its maximum opening, one achieves a maximum conductance of the valve. The more a valve is open the larger is its conductance, and the shorter the time constant $\tau_p$.

From the above discussion, maximizing the total valve conductance, $C_t$ results in the fastest setting time for the upstream pressure and hence the two flows, and the smallest pressure drop through the flow ratio controller 106. Therefore, if a control algorithm can achieve the maximum valve conductance for a given flow ratio at any time, the flow ratio controller will achieve the optimal control performance in terms of fastest settling time for ratio and flows, and minimum pressure drop though the flow ratio controller.

Figure 2:
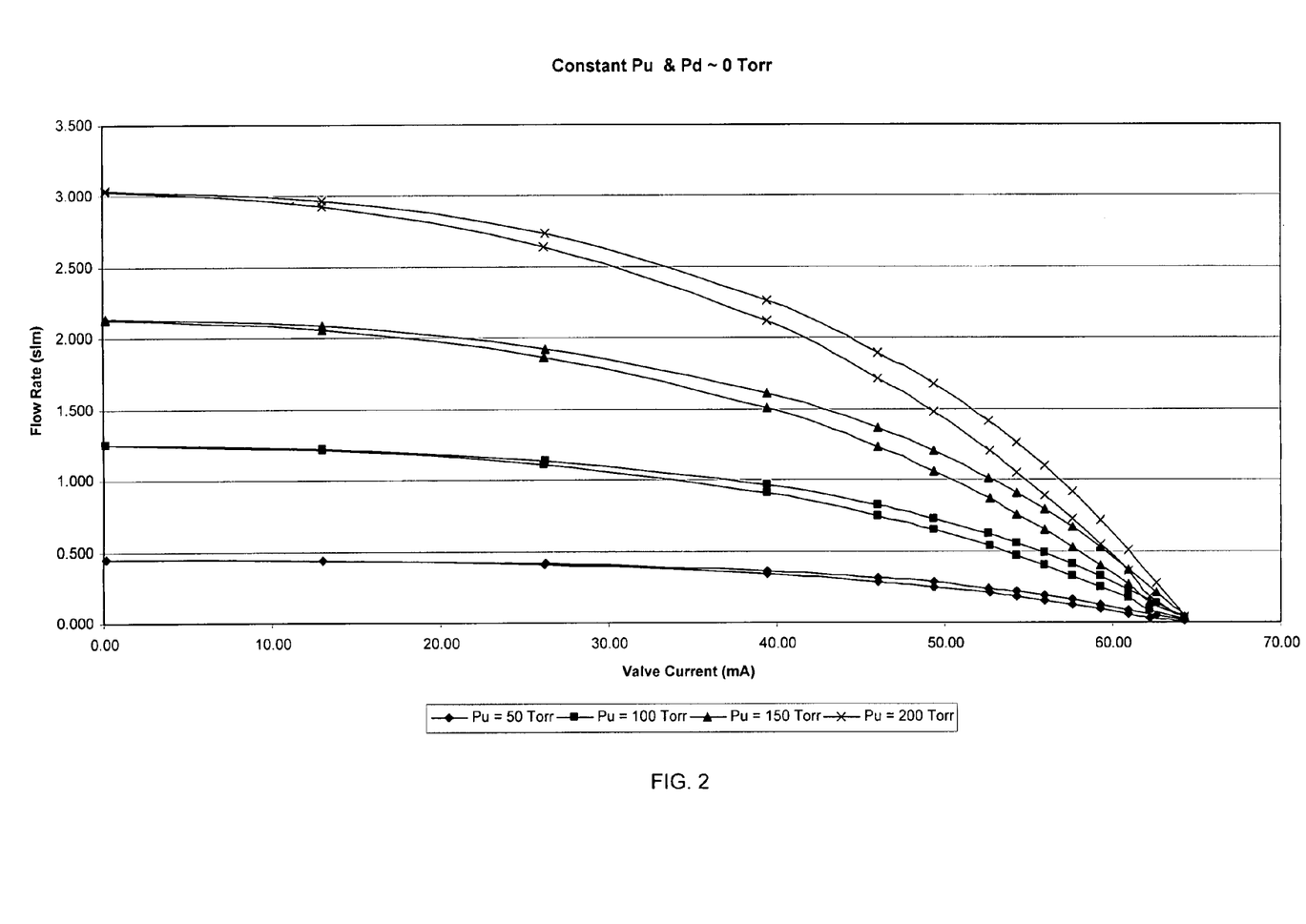
FIG. 2 is a graphical representation of flow rate versus valve control signal at different upstream pressures for a typical normally opened valve.

FIG. 2 shows a graphical representation of valve control current vs flow rate for a typical normally opened valve positioned in the two secondary flow lines where the upstream and downstream pressures are constant. Four sets of curves are shown four upstream pressures of 50, 100, 150 and 200 Torr while the downstream pressure is close to 0 Torr. As shown, for normally opened valve, the valve conductance deceases as the valve current increases.

From the definition of the flow ratio, i.e. $\alpha=Q_2/Q_1$, and Equations (1) and (2), the following equation for a given flow ratio a can be obtained, $$Q_2(I_2, P_u, P_{d2})\alpha = Q_1(P_u, P_{d1}) \quad (10)$$

Figure 3:
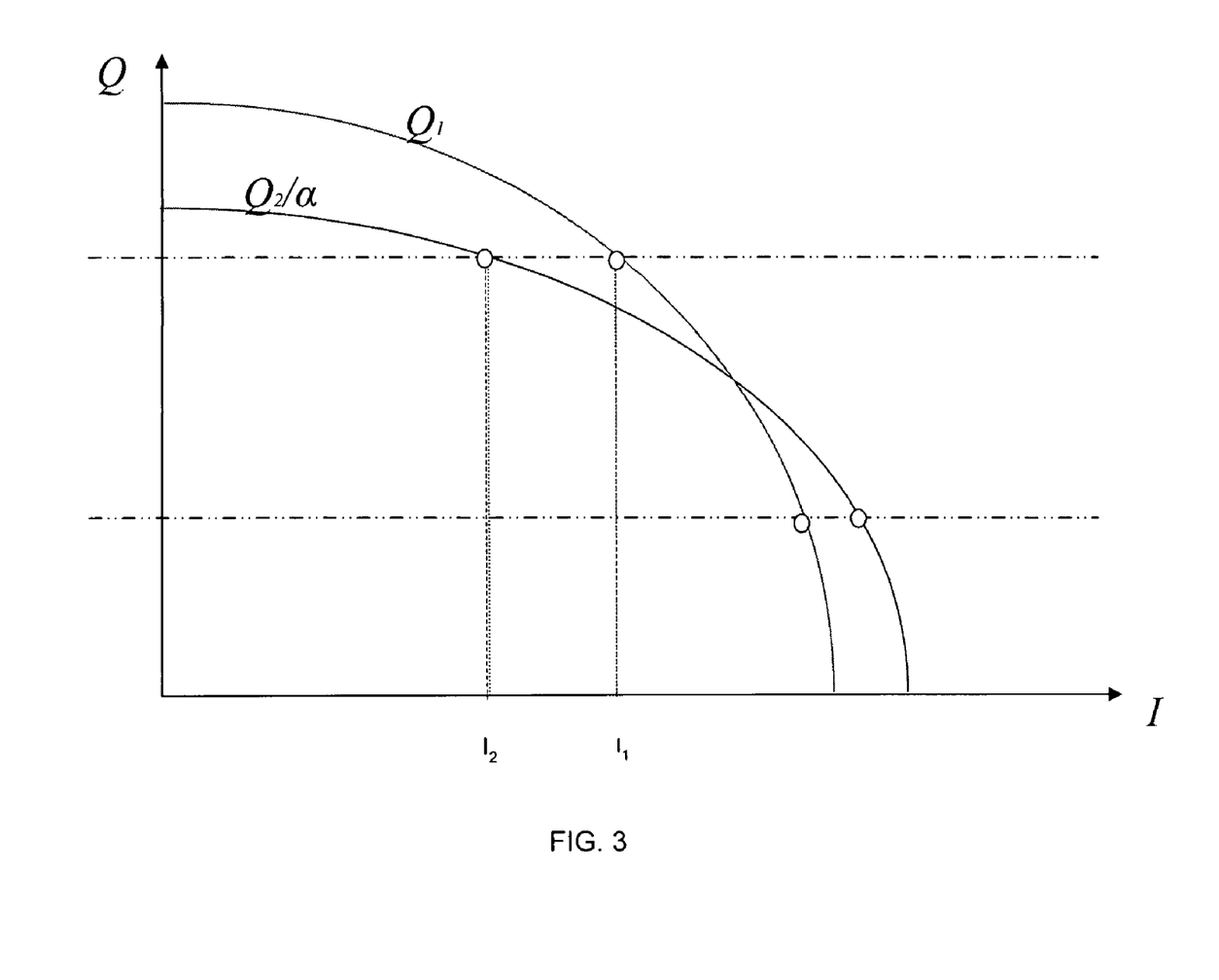
FIG. 3 is a graphical representation of flow rates for the two control valves of the FIG. 1 embodiment; as a function of the control signal applied to each valve showing that there are multiple solutions of two valve control commands for the given flow ratio $\alpha$.

The left side and the right side of the above equation (10) are plotted as two curves in FIG. 3 for a given flow ratio $\alpha$. As one can see, the intersections of these two curves with any horizontal line give a set of solution of valve currents $I_1$ and $I_2$ which satisfies Equation (10). In other words, there are multiple solutions for $I_1$ and $I_2$ for a given flow ratio $\alpha$.

FIG. 3 shows two sets of solution of $I_1$ and $I_2$ for a given flow ratio $\alpha$. For normally opened valves, the higher the valve current, the lower the valve conductance (or the valve is less opened). Therefore the set of smaller values of $I_1$ and $I_2$ gives a higher valve conductance than the other set of the solution, which has a faster settling time for ratio, flows, and upstream pressure, and a smaller pressure drop through the controller as we discussed above.

Figure 4:
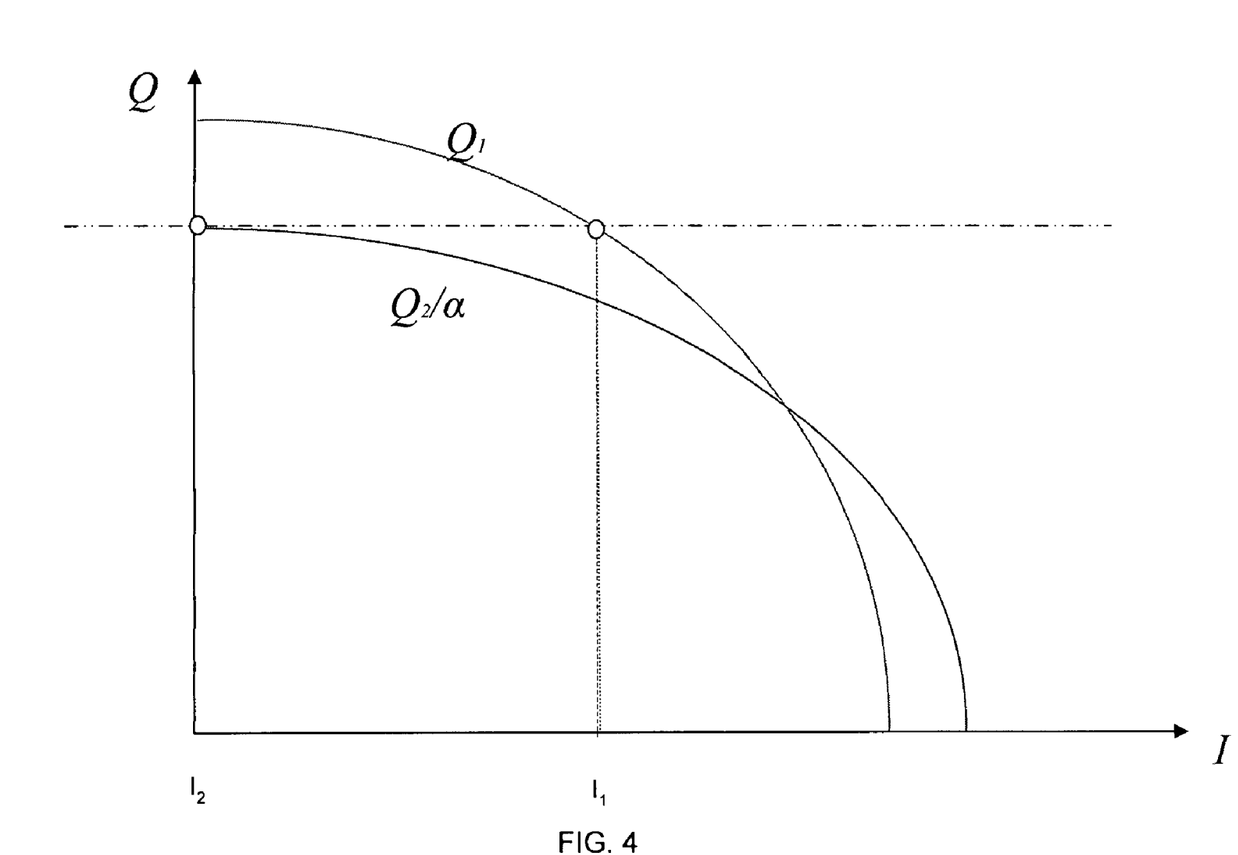
FIG. 4 is a graphical representation of flow rates for the two control valves of the FIG. 1 embodiment; as a function of the control signal applied to each valve showing the optimal solution with the maximum allowable valve conductance for the flow ratio controller of the FIG. 1 embodiment.

FIG. 4 shows that there exists one and only one set of the optimal solution when $I_2=0$ (or $I_1=0$ depending on the flow ratio $\alpha$ and valve curves) or one valve is fully open. It is at this point that the total valve conductance, $C_t$, is at its maximum. Therefore the pressure drop across the flow ratio controller is at its minimum, and the device is capable of providing the fastest response and the settling times for ratio, flows and the upstream pressure. Further, for normally opened valves, the slope of valve current vs flow rate is small when the valve current is small as shown FIG. 2. The smaller the slope, the smaller the variation of flow rate for a given fixed valve current change. If the valve current has any noise, the small slope region in FIG. 4 will has less impact on flows therefore the flow ratio is more stable. In other words, the system is less sensitive to valve current noise and is therefore more robust in the region of operation.

Figure 5:
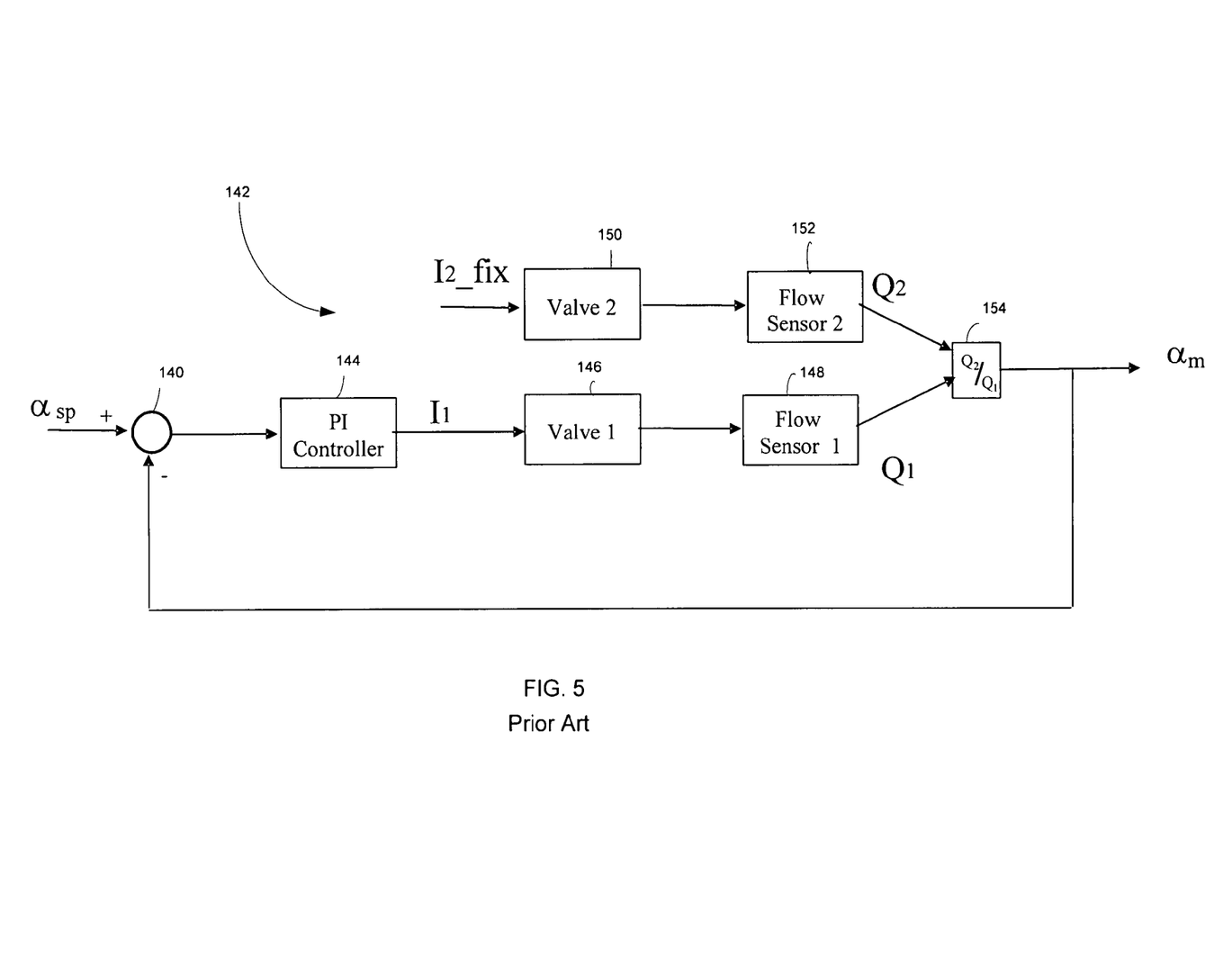
FIG. 5 is a functional block diagram of a prior art control algorithm for controlling the ratio of flow through two secondary flow lines of a flow ratio controller where the high flow valve is at a fixed valve position and the low flow valve is actively controlled to maintain the flow ratio.

Using a fixed current to control one of the valves, such as the control algorithm shown in FIG. 5 creates a solution very far away from the optimal solution which has the maximum valve conductance, as just described. In this control system approach controller is configured to receive the ratio set point $\alpha_{sp}$ at the input of summing junction 140 of the control system 142. The summing junction has an output connected the input of a PI controller 144, which in turn provides the control current $I_1$ to the low flow control valve 146. The flow through valve 146 is sensed by flow sensor 148, which in turn provides a signal representing the flow $Q_1$ through that flow line. A fixed current $I_2$ is applied to the high flow control valve 150. The flow through valve 150 is sensed by flow sensor 152, which in turn provides a signal representing the flow $Q_2$ through that flow line. The ratio of the two signals $Q_2/Q_1$ is the measured flow ratio $\alpha_m$. The latter is provided in a feedback loop to the summing junction 140 and subtracted from the input set point $\alpha_{sp}$. The problem with this design is that the total valve conductance is not at the maximum for a given flow ratio $\alpha$. The fixed valve is usually chosen in the high flow line, and it is usually set at a very conservative position, e.g. half open, in order to counteract the mismatch of two valves, the hysteresis of valves, and the downstream block of the other flow line. Therefore, the total valve conductance is very low compared with the optimal solution shown in FIG. 4. As discussed above, the lower the total valve conductance, the slower the settling time for flows and the higher the pressure drop across the flow ratio controller. Even for a very conservative fixed valve position in the fixed valve flow line, the flow ratio controller still cannot handle very severe downstream blocking issues on the other flow line. For instance, the controlled valve in the other flow line could be driven to the fully open position due to a severe downstream blocking. However, the fixed valve does not provide an adjustment in order to maintain the flow ratio. Therefore, the actual flow ratio is away from the set point.

In accordance with one aspect of the invention, the system is configured so that both valves are controlled through a ratio feedback loop by a single input single output (SISO) controller of any type, e.g. a PID controller. The output of the SISO controller is split and modified to control each of the two valves. The two valve control commands are virtually antisymmetric with respect to the maximum allowable valve conductance position, i.e., the relationship of the control commands occurs by virtue of the fact that the output of the SISO controller is used to control one valve, while the same output is first inverted and added with a bias current, and then used to control the other valve. The two valve commands are each passed through a linear saturator with the maximum allowable valve conductance position as one of the two saturation limits. The net effect is that one valve is kept at the maximum allowable valve conductance position at any moment, while the other is actively controlled to maintain the flow ratio. A preferred embodiment of the antisymmetric optimal control system is shown in FIG. 6.

Figure 6:
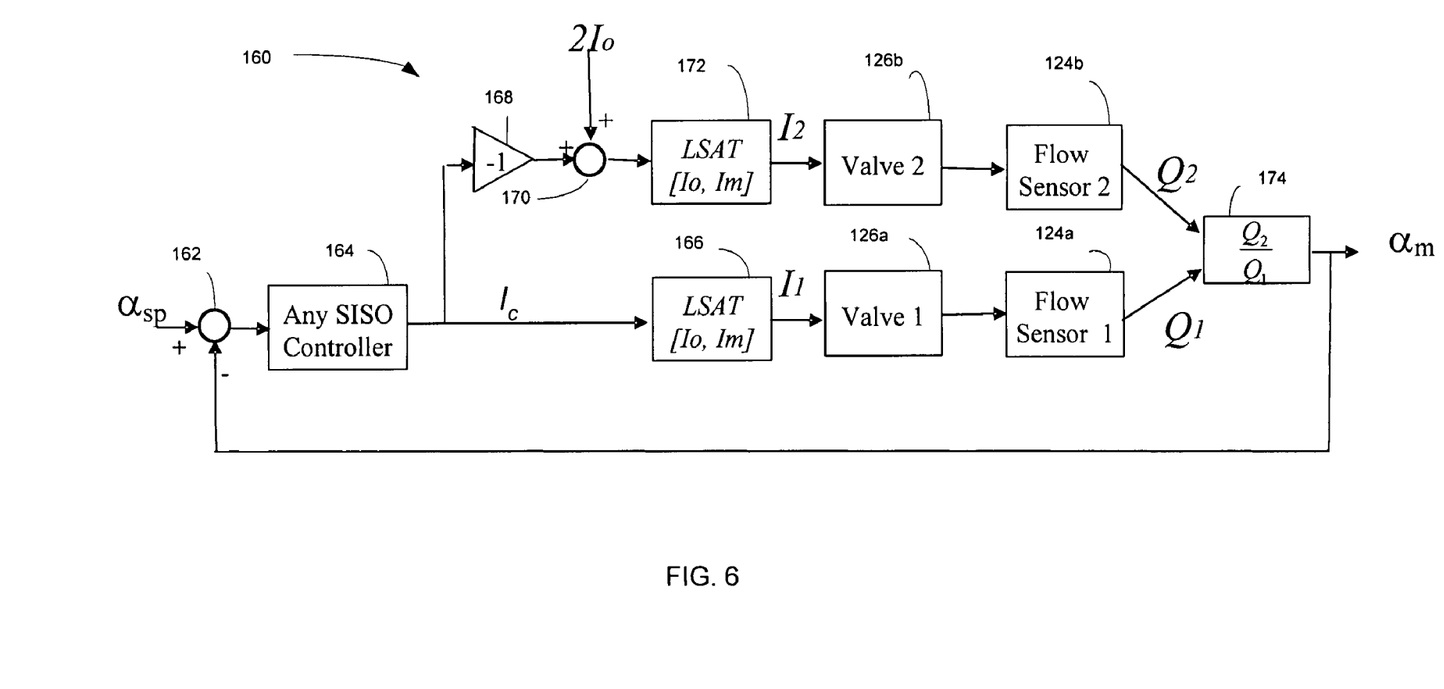
FIG. 6 is a functional block diagram of the preferred antisymmetric optimal control algorithm for controlling the ratio of flow through the two secondary flow lines of the FIG. 1 embodiment where both valves are controlled and two valve control commands are virtually antisymmetric with respect to the maximum allowable valve conductance.

Referring to FIG. 6, the preferred antisymmetric optimal feedback control system 160 is used to control both valves 126a and 126b, so as to, among other things, eliminate the constraints imposed by controlling one valve with a fixed current. The feedback control system is preferably accomplished in software run on the controller 136 of FIG. 1, although the system can be implemented in other forms. The feedback control system 160 includes an input to a summing junction 162 for receiving a signal representative of the set point for the flow ratio $\alpha_{sp}$, and another input for receiving a signal representative of the measured flow ratio $\alpha_m$ The summing junction 162 calculates the error signal between $\alpha_{sp}$ and $\alpha_m$, and then feeds this error signal to an SISO controller 164, which for example can be a PID controller. The output of the controller 164, $I_c$, is connected to the input of the linear saturator (LSAT) 166, which in turn is connected to provide the control current $I_1$, to the valve 126a. The flow through the valve 126a will directly affect the flow and thus the output of the corresponding flow sensor 124a. The output of the sensor represents the flow rate $Q_1$. The output of the SISO controller, $I_c$, is also applied to an inverter 168, which in turn applies an input to the summing junction 170. The latter also receives a fixed bias current input, $2I_o$, which is added to the output of the inverter 168. The summed signal is then applied to the input of the linear saturator (LSAT) 172, which in turn provides an output current $I_2$. The control current $I_2$ controls valve 126b, which in turn affects the flow through the sensor 124b. The latter provides an output $Q_2$ representative of the flow through the second flow line. The ratio $Q_2/Q_1$ represents the measured ratio $\alpha_m$. The measured ratio $\alpha_m$ is subtracted from the set point at the summing junction 162 as a control feedback arrangement.

The linear saturators are each defined as:

$$LSAT(x) = LSAT_{[a,b]}(x) = \begin{cases} x, & (\text{if}, a \leq x \leq b) \\ a, & (\text{if}, x < a) \\ b, & (\text{if}, x < b). \end{cases} \quad (11)$$

where a is the low saturation limit and b the high saturation limit.

Define $I_o$ as the optimal valve current which provides the maximum allowable valve conductance. In general, for normally opened valves, $$I_o = I_{min} \quad (12)$$

and for normally closed valves, $$I_o = I_{max} \quad (13)$$

where $I_{min}$ is the minimum allowable valve current and $I_{max}$ the maximum allowable valve current.

The antisymmetric optimal control algorithm determines the two valve control commands, i.e. $I_1$ and $I_2$, as follows: for normally opened valves, $$I_1 = \underset{[I_o, I_m]}{LSAT}(I_o + (I_c - I_o)) = \underset{[I_o, I_m]}{LSAT}(I_c) \quad (14)$$

$$I_2 = \underset{[I_o, I_m]}{LSAT}(I_o - (I_c - I_o)) = \underset{[I_o, I_m]}{LSAT}(2I_o - I_c) \quad (15)$$

where $I_m$ is the maximum allowable valve current for normally opened valves; for normally closed valves, $$I_1 = \underset{[I_m, I_o]}{LSAT}(I_o + (I_c - I_o)) = \underset{[I_m, I_o]}{LSAT}(I_c) \quad (16)$$

$$I_2 = \underset{[I_m, I_o]}{LSAT}(I_o - (I_c - I_o)) = \underset{[I_m, I_o]}{LSAT}(2I_o - I_c) \quad (17)$$

where $I_m$ is the minimum allowable valve current for normally closed valves.

Thus, the inputs to the two linear saturators, i.e. $(I_o + (I_c - I_o))$ and $(I_o - (I_c - I_o))$, are antisymmetric with respect to the optimal valve current, $I_o$. Therefore, the output valve control commands after the linear saturators are virtually antisymmetric with respect to the optimal valve current, $I_o$.

The two linear saturators play an important role in the antisymmetric optimal control algorithm. In general, one of the valve currents ($I_1$ or $I_2$) will be a feasible valve current within the allowable current limits as $[I_o, I_m]$ for normally opened valves, or $[I_m, I_o]$ for normally closed valves. By the nature of antisymmetry with respect to the optimal valve current, $I_o$, the other valve current ($I_2$ or $I_1$) will be outside of the allowable current limits posed by $[I_o, I_m]$ or $[I_m, I_o]$, and it is outside with respect to $I_o$. Because of the linear saturator, any valve current which is outside of the saturation limit, i.e. $I_o$ in this case, will be forced to have the value of the saturation limit. Therefore, one of the valve currents is always kept at the optimal valve current, $I_o$, which gives a maximum allowable valve current. In other words, the antisymmetric optimal control algorithm assures that either $I_1 = I_o$, or $I_2 = I_o$ at any time. The following provides a proof for normally opened valves, but it should be understood that the same principals will apply to normally closed valves also.

For normally opened valve, the two valve control currents, i.e. $I_1$ and $I_2$, are described by Equations (14) and (15). There are two cases for these two valve control currents, i.e. Case 1. If $I_1 \geq I_o$, then $$I_1 = I_c \geq I_o \text{ or } (I_c - I_o) \geq 0 \quad (18)$$

The current applied to the linear saturator 172 is $$I_2' = I_o - (I_c - I_o) \leq I_o \text{ according to Equation (18)} \quad (19)$$

So the valve control current pass through the linear saturator 172 is $$I_2 = LSAT_{[I_o, I_m]}(I_2') = I_o \quad (20)$$

Case 2. if $I_2 \geq I_o$, then $$I_2 = I_o - (I_c - I_o) \geq I_o \quad (21)$$

Rearrange the above equation, and we have $$I_c \leq I_o \quad (22)$$

According to Equation (14), $$I_1 = LSAT_{[I_o, I_m]}(I_c) = I_o, \text{ according to Equations (22) and (11)} \quad (23)$$

As can be seen, in either case, there is one valve current having the value of the optimal valve current, $I_o$, which provides a maximum allowable valve conductance.

Thus, both valves are controlled through a ratio feedback loop by any single input, single output SISO controller, e.g., a PID controller. The output of the SISO controller is split and modified before being applied to the two valves. The two valve control commands are virtually antisymmetric with respect to the maximum allowable valve conductance position. Due to the fact that these two valve commands are passing through respective linear saturators with the maximum allowable valve conductance position as one of the two saturation limits, the net effect is that one valve is kept at the maximum allowable valve conduction position at any moment of time while the other is actively controlled to maintain the flow ratio. Therefore, the antisymmetric optimal control algorithm gives a maximum allowable total valve conductance at any moment. As discussed above, the maximum total valve conductance will give a fast settling time for ratio, flows and upstream pressure, and low pressure drop across the flow ratio controller. Thus, the antisymmetric optimal control algorithm greatly improves the control performance of the flow ratio controller.

Figure 7:
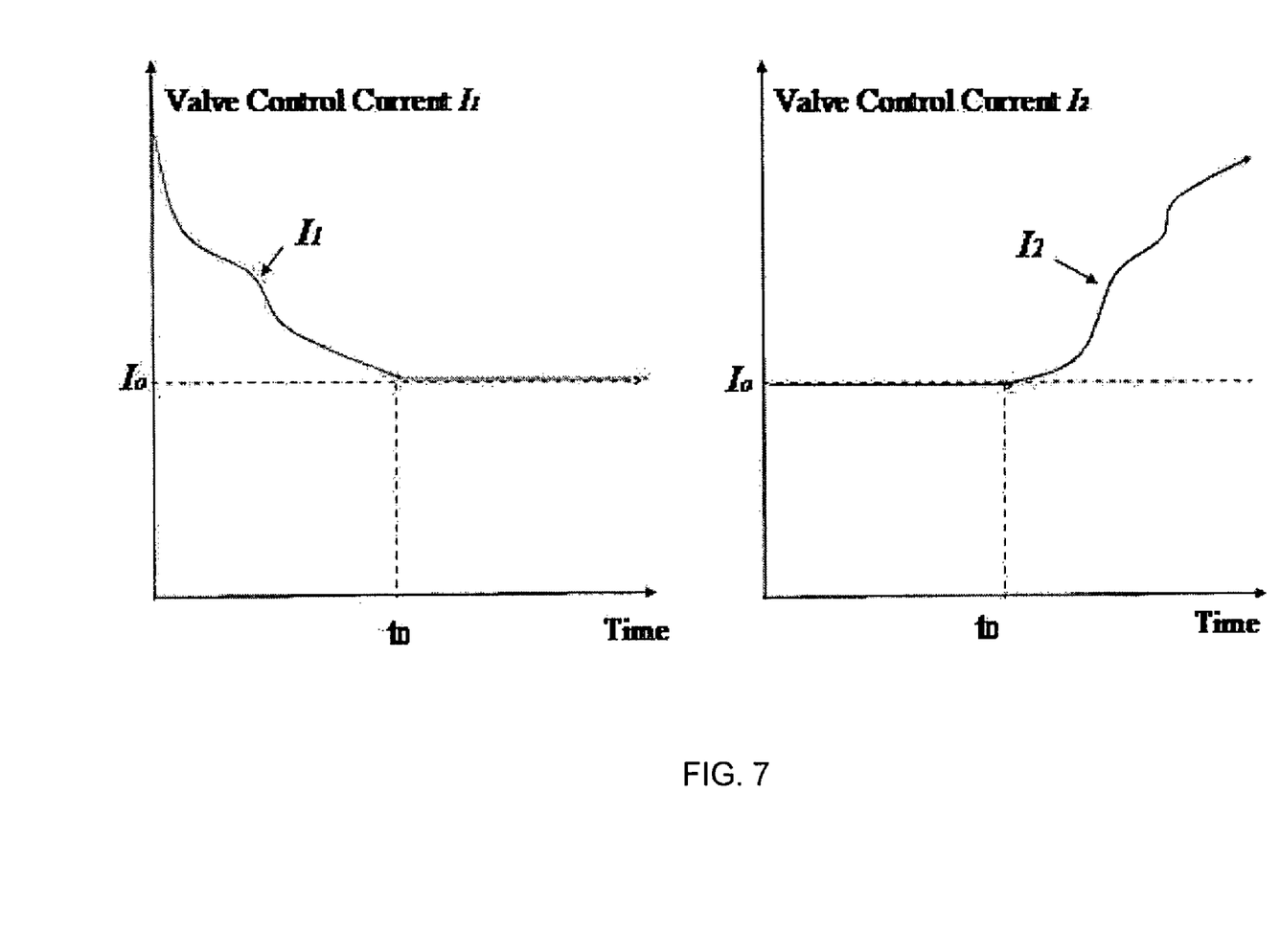
FIG. 7 is a graphical illustration of how the two normally opened valves operate in a virtually antisymmetrical fashion with respect to the optimal valve current Io.

FIG. 7 illustrates the antisymmetrical optimal control of the two normally opened valves. As shown, one of the valves is always operating at the optimal valve current $I_o$ which gives a maximum allowable valve conductance. For a normally opened valve, as the valve current decreases, the valve conductance increases or the valve opens more. In general, the optimal valve current Io is the low current limit or the minimum allowable valve current for normally opened valves. As the valve controlled by the current $I_1$ begins to open due to down stream blockage in this flow line, it will continue to do so until it is completely open or hits the low current limit $I_o$ at time $t_0$. The valve current would continue to decrease if it could. Instead the valve controlled by the current $I_2$ will begin to increase from a value of $I_o$ at $t_0$, by the virtue of being antisymmetric to the optimal current $I_o$, in order to maintain the flow ratio.

Thus, the controller is configured to provide the following:

(a) antisymmetric optimal control of the mass flow in the secondary flow lines so as to maintain the ratio of the secondary flows;

(b) at least one of the valves is at the optimal valve current $I_o$, providing maximum allowable valve conductance position at any one moment of operation (due to the use of the linear saturator), while the other valve is actively controlled to maintain the preselected value of the flow ratio; and (c) control of the mass flow in the secondary flow lines so as to maintain the ratio of the secondary flows at the preselected set point such that should the flow decrease in one flow line so that the ratio of the secondary flows deviates from the preselected set point, the controller will adjust the relative secondary flows through the secondary flow lines so as to bring the ratio back to the preselected set point. If one valve increases openness and hits the optimal valve current, it will kept at the optimal valve current which provides the maximum allowable valve conductance. The other valve which is initially at the optimal valve current will begin to close in order to maintain the preselected flow ratio set point. In this way, the two valves can automatically switch the active control to each other to handle very severe downstream blocking issues in either flow lines.

Thus, a new and improved gas delivery system and method provided in accordance with the present disclosure have been described. The exemplary embodiment described in this specification have been presented by way of illustration rather than limitation, and various modifications, combinations and substitutions may be effected by those skilled in the art without departure either in spirit or scope from this disclosure in its broader aspects and as set forth in the appended claims. For example, while the valves have been described mostly as normally opened valves, it is also valid for normally closed valves. Further, which the flow ratio controller is described as including two secondary flow lines, it is possible to design the controller with more secondary flow lines.

The gas delivery system and method of the present disclosure as disclosed herein, and all elements thereof, are contained within the scope of at least one of the following claims. No elements of the presently disclosed chip arch are meant to be disclaimed, nor are they intended to necessarily restrict the interpretation of the claims.

What is claimed is:

1. A system for dividing a single mass flow into two or more secondary flows comprising:
   (A) an inlet adapted to receive the single mass flow;
   (B) at least two secondary flow lines connected to the inlet and connected to carry corresponding ones of the secondary flows, each flow line including:
      (1) a flow meter connected to measure flow through the corresponding flow line and providing a signal representative of the measured flow through that flow line;
      (2) a valve connected to control flow through the corresponding flow line based upon a control signal;
   (C) a controller connected to the flow meters and the valves for controlling the ratio of the secondary flows;
   wherein the controller is configured to provide antisymmetric optimal control of the mass flow in the secondary flow lines so as to maintain the ratio of the secondary flows at a preselected value; and
   a SISO controller connected so as to generate a first control signal as a function of the difference between the ratio as preselected and the ratio as measured, and a pair of linear saturators, one for each of the secondary flow lines, configured so as to provide valve control signals in response to the first control signal so as to control each of the valves.

2. A system according to claim 1, further including an inverter configured so as to invert the first control signal so as to provide an inverted control signal, a summing junction for combining the inverted control signal and a fixed bias signal so as to provide a second control signal, wherein one of the valve control signals provided by one of the linear saturators is a function of the second control signal.

3. A method of controlling two valves in two or more secondary flow lines of a flow ratio controller so as to control flow ratio through the secondary flow lines, comprising:
   using antisymmetric optimal control of mass flow in the secondary flow lines so as to maintain the ratio of the secondary flows at a preselected value, by generating a control signal as a function of the difference between the ratio as preselected and the ratio as measured, and generating valve control signals for each of the valves in response to the control signal, so as to control each of the two valves.

4. A system for dividing a single mass flow into two or more secondary flows comprising:
   (A) an inlet adapted to receive the single mass flow;
   (B) at least two secondary flow lines connected to the inlet and connected to carry corresponding ones of the secondary flows, each flow line including:
      (1) a flow meter connected to measure flow through the corresponding flow line and providing a signal representative of the measured flow through that flow line;
      (2) a valve connected to control flow through the corresponding flow line based upon a control signal;
   (C) a controller connected to the flow meters and the valves for controlling the ratio of the secondary flows at a preselected value;
   wherein the controller is configured so that at least one of the valves is kept at the optimal valve current which provides a maximum allowable valve conductance position at any one moment of operation, while the other valve is actively controlled to maintain the preselected value of the flow ratio, and further including a SISO controller connected so as to generate a first control signal as a function of the difference between the ratio as preselected and the ratio as measured, and a pair of linear saturators, one for each of the secondary flow lines, configured so as to provide valve control signals in response to the to the first control signal so as to control each of the valves.

5. A system according to claim 4, further including an inverter configured so as to invert the first control signal so as to provide an inverted control signal, a summing junction for combining the inverted control signal and a fixed bias signal so as to provide a second control signal, wherein one of the valve control signals provided by one of the linear saturators is a function of the second control signal.

6. A method of controlling two valves in two or more secondary flow lines of a flow ratio controller so as to control flow ratio through the secondary flow lines, comprising:
   maintaining at least one of the valves in an optimal position which gives a maximum allowable valve conductance position at any one moment of operation, while actively controlling the other valve so as to maintain a preselected value of the flow ratio, by generating a control signal as a function of the difference between the ratio as preselected and the ratio as measured, and generating valve control signals for each of the valves in response to the control signal, so as to control each of the two valves.

7. A system for dividing a single mass flow into two or more secondary flows comprising:
(A) an inlet adapted to receive the single mass flow;
(B) at least two secondary flow lines connected to the inlet and connected to carry corresponding ones of the secondary flows, each flow line including:
(1) a flow meter connected to measure flow through the corresponding flow line and providing a signal representative of the measured flow through that flow line;
(2) a valve connected to control flow through the corresponding flow line based upon a control signal;
(C) a controller coupled to the flow meters and the valves for controlling the ratio of the secondary flows so as to maintain the ratio at a preselected set point;
and
further including a SISO controller connected so as to generate a first control signal as a function of the difference between the ratio as preselected and the ratio as measured, and a pair of linear saturators, one for each of the secondary flow lines, configured so as to provide valve control signals in response to the to the first control signal so as to control each of the valves.

8. A system according to claim 7, further including an inverter configured so as to invert the first control signal so as to provide an inverted control signal, a summing junction for combining the inverted control signal and a fixed bias signal so as to provide a second control signal, wherein one of the valve control signals provided by one of the linear saturators is a function of the second control signal.

9. A system according to claim 7, wherein should one valve increase its openness and hit the optimal valve current, the valve will be kept at the optimal valve current which provides the maximum allowable valve conductance, and the other valve which is initially at the optimal valve current will begin to close in order to maintain the preselected flow ratio set point so that the two valves can automatically switch the active control to each other.

10. A method of controlling two valves so as to control two or more secondary flows in corresponding secondary flow lines of a flow ratio controller so as to control a flow ratio of the secondary flows, comprising:
maintaining the flow ratio of the secondary flows at a preselected set point such that should flow decrease in one of the flow lines so that the ratio of the secondary flows deviates from the preselected set point, the controller will adjust the relative secondary flows through the secondary flow lines by generating valve control signals in response to a first control signal that is a function of a difference between the preselected set point and the flow ratio as measured, so as to bring the ratio back to the preselected set point.

11. The method according to claim 10, wherein if one valve increases openness and hits the optimal valve current, the valve will be kept at the optimal valve current which provides the maximum allowable valve conductance, and the other valve which is initially at the optimal valve current will begin to close in order to maintain the preselected flow ratio set point so that the two valves can automatically switch the active control to each other.

12. A gas delivery system comprises a flow ratio controller including:
a pair of secondary flow lines;
a pair of valves configured to respectively control the flow through secondary flow lines in response to control command signals, and
a flow controller configured to control the flow through each of valves in accordance with a preselected flow ratio, the controller including a feedback loop, a single output SISO controller and a pair of linear saturators, one for use with each of the valves, the SISO controller having an output; wherein the control command signals for the valves are a function of output of the SISO controller and respective ones of the linear saturators, and the two valve control commands are virtually antisymmetric to the maximum allowable valve conductance position of the valves.

13. A gas delivery system according to claim 12, wherein the two valve control commands are virtually antisymmetric to the maximum allowable valve conductance position of the valves.

14. A gas delivery system according to claim 13, wherein the net effect of the use of linear saturators is that the valve command of one valve control is kept at the optimal valve current which gives a maximum allowable valve conductance, while the other is actively controlled in order to maintain the preselected flow ratio set point.

15. A gas delivery system according to claim 13, wherein one of linear saturators receives a bias current and an inverted signal so as to maintain the inputs to the two linear saturators antisymmetric, and hence the valve control commands are virtually antisymmetric to the maximum allowable valve conductance.

* * * * *

UNITED STATES PATENT AND TRADEMARK OFFICE
CERTIFICATE OF CORRECTION

PATENT NO. : 7,621,290 B2  Page 1 of 1
APPLICATION NO. : 11/111646
DATED : November 24, 2009
INVENTOR(S) : Ding et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Twenty-sixth Day of October, 2010

David J. Kappos
*Director of the United States Patent and Trademark Office*